United States Patent
Oguchi et al.

(10) Patent No.: US 11,088,604 B2
(45) Date of Patent: Aug. 10, 2021

(54) VARIABLE MAGNETIC FLUX-TYPE PERMANENT MAGNET ROTARY ELECTRIC MACHINE

(71) Applicant: FUJI ELECTRIC CO., LTD., Kawasaki (JP)

(72) Inventors: Hideki Oguchi, Hino (JP); Makoto Terajima, Suzuka (JP); Hitoshi Nakazono, Suzuka (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 535 days.

(21) Appl. No.: 16/046,452

(22) Filed: Jul. 26, 2018

(65) Prior Publication Data
US 2019/0097509 A1    Mar. 28, 2019

(30) Foreign Application Priority Data
Sep. 27, 2017 (JP) .............................. JP2017-186187

(51) Int. Cl.
*H02K 1/27* (2006.01)
*H02K 21/02* (2006.01)

(52) U.S. Cl.
CPC .......... *H02K 21/029* (2013.01); *H02K 1/276* (2013.01); *H02K 1/2766* (2013.01); *H02K 2213/03* (2013.01); *H02K 2213/09* (2013.01)

(58) Field of Classification Search
CPC ............. H02K 1/276–2766; H02K 21/028–29
See application file for complete search history.

(56) References Cited

U.S. PATENT DOCUMENTS

| 9,692,265 B2 | 6/2017 | Kato et al. |
| 2015/0340915 A1 | 11/2015 | Kato et al. |
| 2017/0279322 A1* | 9/2017 | Sasaki .................... G01N 27/82 |

FOREIGN PATENT DOCUMENTS

| JP | H08-275419 A | 10/1996 |
| JP | 2010-220359 A | 9/2010 |
| JP | 2015-521838 A | 7/2015 |
| JP | 6033425 B2 | 11/2016 |
| JP | 2017-017783 A | 1/2017 |

OTHER PUBLICATIONS

Japan Patent Office, "Office Action for Japanese Patent Application No. 2017-186187," dated Jun. 1, 2021.

* cited by examiner

*Primary Examiner* — Ramon M Barrera
(74) *Attorney, Agent, or Firm* — Manabu Kanesaka

(57) ABSTRACT

Provided is a variable magnetic flux-type permanent magnet rotary electric machine wherein a leakage magnetic flux leaking from a certain permanent magnet included in the rotor core to a permanent magnet circumferentially adjacent on either side of the certain permanent magnet is controlled by q-axis current and thereby a magnetic flux emanating from the certain permanent magnet and linking with the armature coil wound on the stator is controlled without forming a mechanically weak part in the rotor core.

20 Claims, 9 Drawing Sheets

VARIABLE MAGNETIC FLUX-TYPE PERMANENT MAGNET ROTARY ELECTRIC MACHINE

RELATED APPLICATIONS

The present application is based on, and claims priority from, Japanese Application No. JP2017-186187 filed Sep. 27, 2017, the disclosure of which is hereby incorporated by reference herein in its entirety.

TECHNICAL FIELD

The present invention relates to a variable magnetic flux-type permanent magnet rotary electric machine.

BACKGROUND ART

A variable magnetic flux-type rotary electric machine configured to control a leakage magnetic flux leaking from a certain permanent magnet included in the rotor to an adjacent permanent magnet by q-axis current and to control thereby the magnetic flux emanating from the certain permanent magnet and linking with the armature coil wound on the stator is conventionally known as disclosed, for example, in PTL 1.

A variable magnetic flux-type rotary electric machine disclosed in PTL 1 includes: a stator including a stator coil wound around the stator; a rotor that defines an air gap between the rotor and the stator, the rotor including at least one permanent magnet; and a magnetic flux bypass path that serves as a route for leakage of magnetic flux from at least one permanent magnet included in the rotor to an adjacent permanent magnet. In this variable magnetic flux-type rotary electric machine, the stator and the rotor being arranged relative to the at least one permanent magnet to set an operating characteristic of $d(Kt(I))/dI \geq 0$ in a range of at or below magnetic saturation of a core material of at least one of the stator and the rotor, where KT represents a torque constant, and I represents an applied current, and a function of the torque constant KT with respect to the applied current I is represented by $KT=Kt(I)$ for a given torque Tr acting on the rotor that is represented by $Tr=KT \times I$. Further, a magnetic flux inflow and outflow part of a magnetic flux bypass path that serves as a route for leakage of magnetic flux to an adjacent permanent magnet pole is disposed near the air gap between the rotor and the stator such that a magnetic flux emanating from the at least one permanent magnet experiences a smaller magnetic field resistance against leakage towards an opposite pole of an adjacent permanent magnet that is adjacent to the at least one permanent magnet than a magnetic field resistance against leakage towards an opposite pole of the at least one permanent magnet.

With the variable magnetic flux-type rotary electric machine disclosed in PTL 1, loss during low load, iron loss during high-speed rotation, and ohmic loss can be inhibited by forming magnetic flux bypass paths that can inhibit the amount of magnetic flux leakage due to the stator armature action between adjacent magnetic poles.

CITATION LIST

Patent Literature

PTL 1: JP 6033425 B

SUMMARY OF INVENTION

Technical Problem

The conventional variable magnetic flux-type rotary electric machine disclosed in PTL 1 has a following problem.

Each of the magnetic flux bypass paths is formed in the portion that is radially outward of the air gap part formed between adjacent magnetic poles of the rotor core and connects magnetic poles. A magnetic path is formed between the magnet slot to which a permanent magnet is fixedly fitted and an air gap part, and a magnetic flux emanating from the N pole of the permanent magnet leaks to the S pole side of the permanent magnet through the magnetic path. The magnetic flux bypass path is formed in a width larger than that of the magnetic path formed between the magnet slot and the air gap part to ensure that the magnetic flux emanating from the N pole of the permanent magnet meets lower magnetic resistance when leaking toward the S pole side of a permanent magnet adjacent to the former permanent magnet than when leaking toward the S pole side of the former permanent magnet. Therefore, the magnetic path formed between the magnet slot and the air gap part is inevitably narrow.

The magnetic path formed between the magnet slot and the air gap part connects the radially outward portion and the radially inward portion of the rotor core across the magnet slot; hence the narrow magnetic path, which is mechanically weak, may break due to centrifugal force during high-speed rotation of the rotor, which is problematic.

The present invention is made to address this problem of the conventional art and an object of the present invention is to provide a variable magnetic flux-type permanent magnet rotary electric machine wherein a leakage magnetic flux leaking from a certain permanent magnet included in the rotor core to a permanent magnet circumferentially adjacent on either side of the certain permanent magnet is controlled by q-axis current and thereby a magnetic flux emanating from the certain permanent magnet and linking with the armature coil wound on the stator is controlled without forming a mechanically weak part in the rotor core.

Solution to Problem

To achieve the above-described objective, a variable magnetic flux-type permanent magnet rotary electric machine according to an embodiment of the present invention includes in essence: a stator including an armature coil wound on a stator core; a rotor rotatably disposed inside the stator core of the stator with an air gap between the rotor and the stator core, the rotor including a cylindrical rotor core with a plurality of magnet slots disposed in a circumferential direction and a plurality of magnetic poles includes a plurality of permanent magnets respectively fixed in the plurality of magnet slots and a nonmagnetic part formed between adjacent magnetic poles of the rotor core and radially outward of the magnet slots, wherein a leakage magnetic flux leaking from a certain permanent magnet among the plurality of permanent magnets to a permanent magnet circumferentially adjacent on either side of the certain permanent magnet is controlled by q-axis current, a magnetic flux emanating from the certain permanent magnet and linking with the armature coil is controlled, and a magnetic flux bypass path for the leakage magnetic flux leaking from the certain permanent magnet to the permanent magnet circumferentially adjacent on either side of the certain permanent magnet is formed in a portion between the magnet slot for fixing the certain permanent magnet and the nonmagnetic part, in a portion radially inward of the nonmagnetic part and in a portion between the nonmagnetic part and the magnet slot for fixing the permanent magnet circumferentially adjacent on either side of the certain permanent magnet.

Advantageous Effects of Invention

According to a variable magnetic flux-type permanent magnet rotary electric machine according to the present invention, there is provided a variable magnetic flux-type permanent magnet rotary electric machine wherein a leakage magnetic flux leaking from a certain permanent magnet included in the rotor core to a permanent magnet circumferentially adjacent on either side of the certain permanent magnet is controlled by q-axis current and thereby a magnetic flux emanating from the certain permanent magnet and linking with the armature coil wound on the stator is controlled without forming a mechanically weak part in the rotor core.

DESCRIPTION OF EMBODIMENTS

Embodiments of the present invention will now be described with reference to the drawings. The embodiments to be described in the following represent an example of a variable magnetic flux-type permanent magnet rotary electric machine configured to control the magnetic flux emanating from a permanent magnet and linking with an armature coil and are intended to be illustrative of a device for embodying the technical idea of the present invention; the technical idea of the present invention is not limited to the embodiments to be described below in terms of material, form, structure, or disposition of the components.

Further, the drawings are schematic diagrams. It should be noted therefore that the drawings are illustrated in different relations, ratios or the like between thicknesses and plane view dimensions from the actual ones and include parts where relations or ratios may be different between the drawings.

First Embodiment

First, a variable magnetic flux-type permanent magnet rotary electric machine according to a first embodiment of the present invention will be described with reference to FIGS. 1 to 4.

Figure 1:
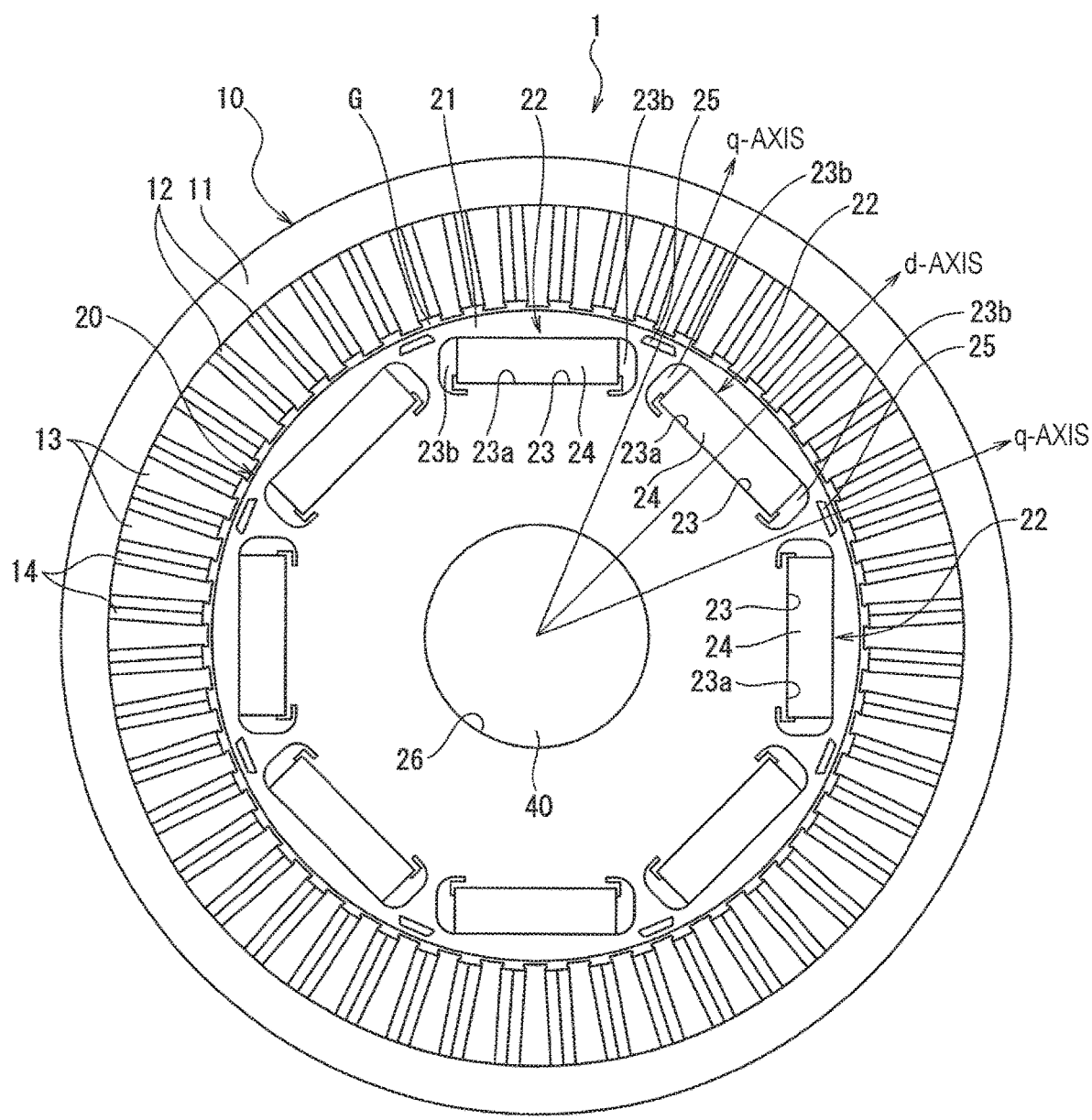
FIG. 1 is a cross-sectional view illustrative of overall structure of a variable magnetic flux-type permanent magnet rotary electric machine according to a first embodiment of the present invention.

The variable magnetic flux-type permanent magnet rotary electric machine according to the first embodiment of the present invention is illustrated in FIG. 1 and the permanent magnet rotary electric machine 1 is an eight-pole interior magnet synchronous motor. Note that the present invention is not restricted in any way by the number of poles, dimensions of other components, or the like.

Figure 2:
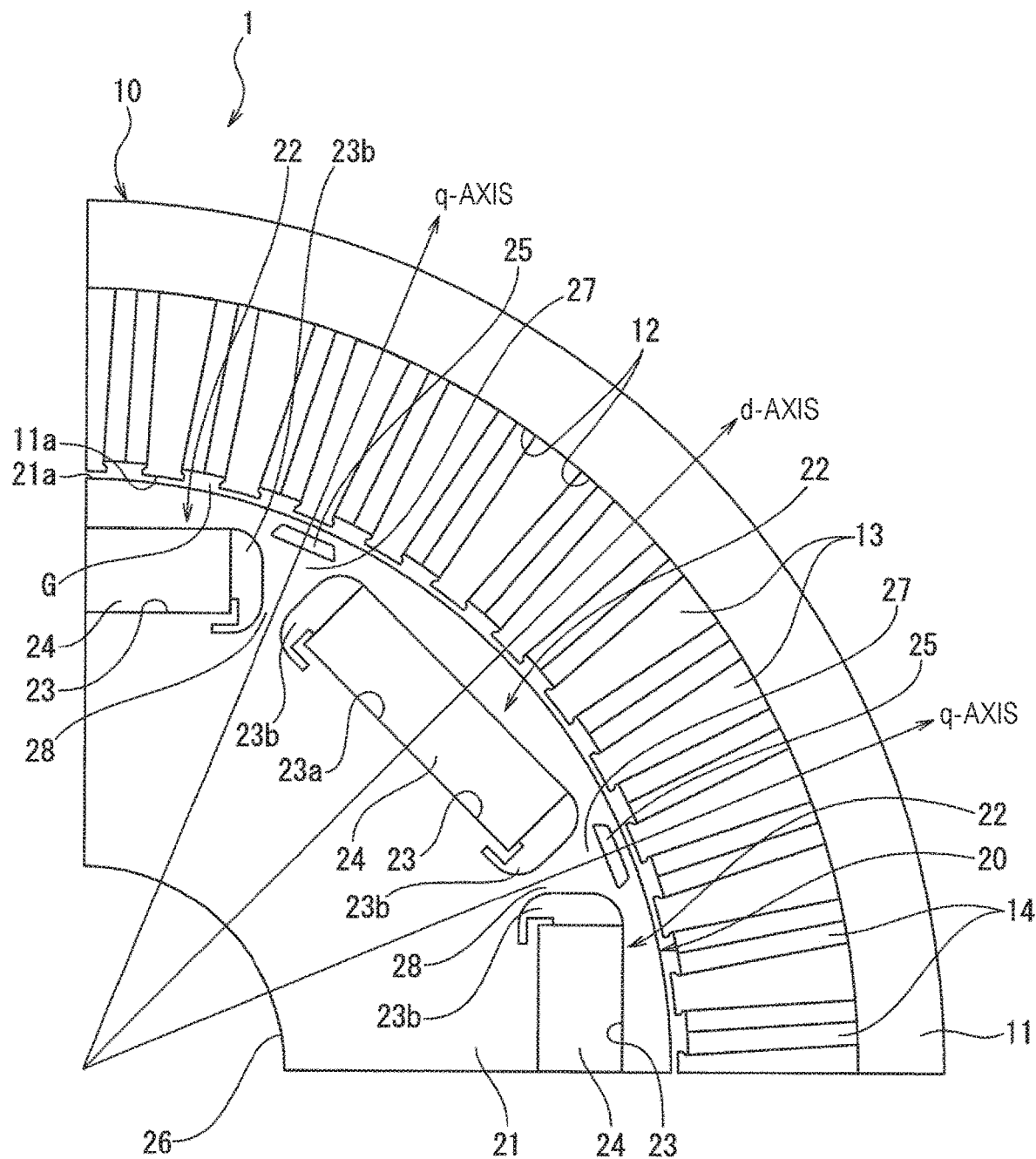
FIG. 2 is a cross-sectional view illustrative of a quarter portion of the permanent magnet rotary electric machine of FIG. 1.

The variable magnetic flux-type permanent magnet rotary electric machine 1 illustrated in FIGS. 1 and 2 includes a stator 10 and a rotor 20 rotatably disposed inside the stator core 11 of the stator 10 with an air gap G between the rotor 20 and the stator core 11.

The stator 10 includes a cylindrical stator core 11. On the inner circumferential surface 11a of the stator core 11 48 pieces of slots 12 and 48 pieces of magnetic pole teeth 13 are formed at equal spacing in the circumferential direction. A plurality of armature coils 14 are wound on the magnetic pole teeth 13. The stator core 11 is a laminated core.

The rotor 20 includes a cylindrical rotor core 21 with an axis hole 26 formed in the center of the rotor core 21 and eight magnetic poles 22 provided on the rotor core 21. The space between the outer circumferential surface 21a of the rotor core 21 and the inner circumferential surface 11a of the stator core 11 constitutes the afore-mentioned air gap G. The rotor core 21 is a laminated core. A rotation axis 40 is fixedly fitted into the axis hole 26 of the rotor core 21 and the rotor 20 rotates with the rotation axis 40. In an outer peripheral portion of the rotor core 21 are formed eight magnet slots 23 at equal spacing in the circumferential direction.

The eight magnetic poles 22 are respectively includes eight permanent magnets 24 fixed in the eight magnet slots 23 formed in the rotor core 21. A certain permanent magnet 24 among the eight permanent magnets 24 is magnetized in a radial direction of the rotor core 21 to have a north pole on the radially outer side while the permanent magnets 24 circumferentially adjacent to the certain permanent magnet 24 are magnetized in a radial direction to have south poles on the radially outer side; the eight magnetic poles 22 are formed in such a manner that the north poles and the south poles alternate in the circumferential direction.

Each of the magnet slots 23 is a through-hole reaching both axial ends of the rotor core 21 and includes a permanent magnet insertion part 23a elongated in the circumferential direction and rectangular in cross section, in which a permanent magnet 24 rectangular in cross section is fixedly inserted, and a pair of air regions 23b formed at both circumferential ends of the permanent magnet insertion part 23a as flux barrier. Each of the magnet slots 23 is formed to be line symmetrical (symmetrical in the circumferential direction) about the corresponding d-axis as illustrated in FIGS. 1 and 2. To the permanent magnet insertion part 23a of each of the magnet slots 23 is fixedly inserted a permanent magnet 24 of a plate-like shape and rectangular in cross section, and each permanent magnet 24 extends to the both axial ends of the rotor core 21.

Figure 3:
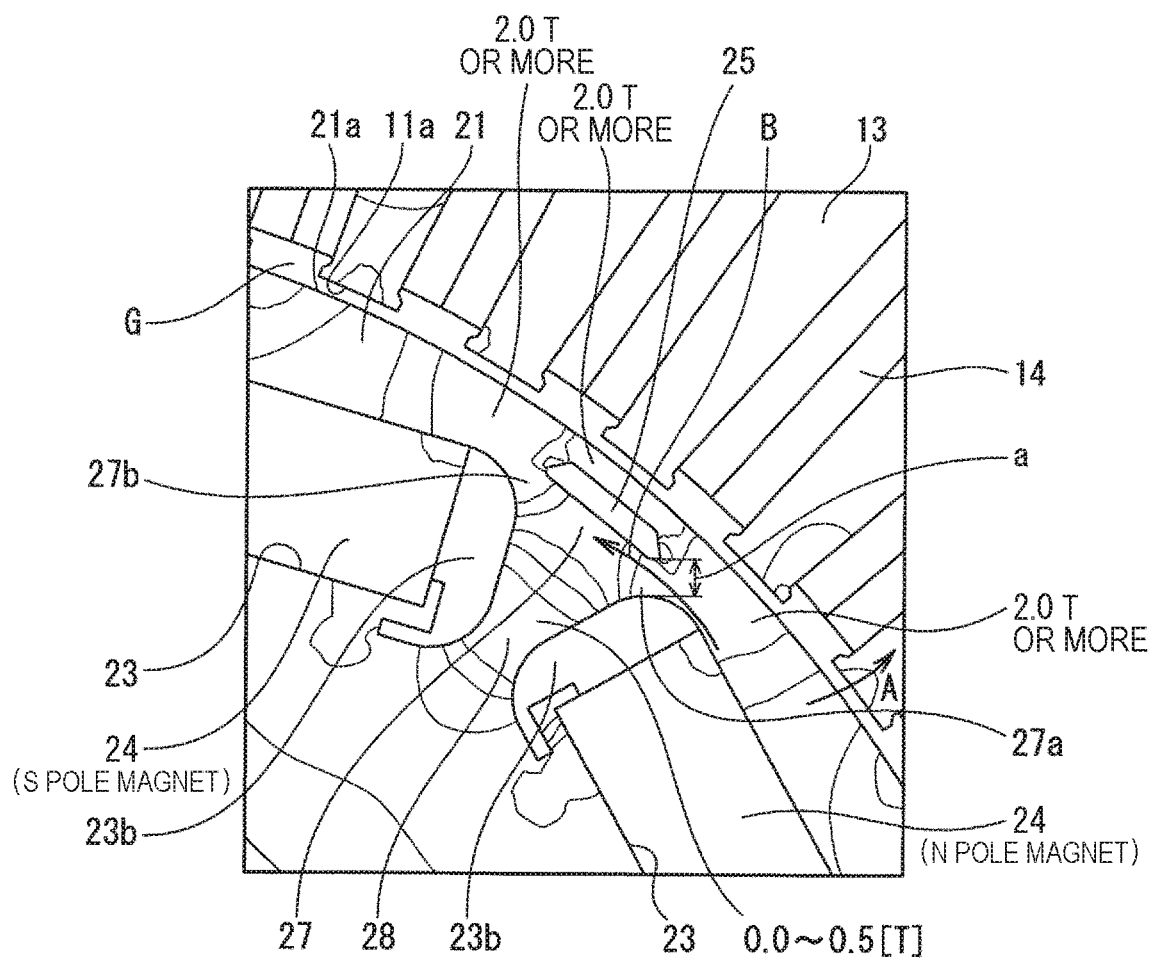
FIG. 3 is a contour map illustrative of a flow of magnetic flux when q-axis current is 0.

The variable magnetic flux-type permanent magnet rotary electric machine 1 is configured to control the leakage magnetic flux A leaking from a certain permanent magnet (N pole magnet, see FIG. 3) 24 among the eight permanent magnets 24 to a permanent magnet (S pole magnet) 25 circumferentially adjacent on either side of the certain permanent magnet 24 (only one adjacent permanent magnet 24 on one circumferential side is illustrated in FIG. 3) by q-axis current as will be described below and to control thereby the magnetic flux emanating from the certain permanent magnet 24 and linking with the armature coils 14.

As illustrated in FIGS. 1 and 2, the variable magnetic flux-type permanent magnet rotary electric machine 1 has air gaps 25 serving as nonmagnetic parts in the rotor core 21, the air gaps formed between adjacent magnetic poles 22 and radially outward of the magnet slots 24. The air gaps 25 are formed at a certain distance radially inward of the outer circumferential surface 21a of the rotor core 21. The air gaps 25 are formed in a shape elongated in the circumferential direction and trapezoidal in cross section and are through-holes reaching both axial ends of the rotor core 21. The air gaps 25 are formed in all portions between adjacent magnetic poles 22 of the rotor core 21.

As illustrated in FIGS. 2 and 3, the variable magnetic flux-type permanent magnet rotary electric machine 1 has a magnetic flux bypass path 27 for the leakage magnetic flux B leaking from a certain permanent magnet (N pole magnet) 24 to a permanent magnet (S pole magnet) 24 circumferentially adjacent on either side of the certain permanent magnet 24, the magnetic flux bypass path 27 being formed in a portion between the magnet slot 23 for fixing the certain permanent magnet (N pole magnet) 24 and an air gap 25, in a portion radially inward of the air gap 25, and in a portion between the air gap 25 and the magnet slot 23 for fixing the permanent magnet (S pole magnet) 24 circumferentially adjacent on either side of the certain permanent magnet 24.

Next, the operation of the variable magnetic flux-type permanent magnet rotary electric machine 1 according to the first embodiment of the present invention is explained with reference to FIGS. 3 and 4.

FIG. 3 illustrates a flow of magnetic flux when no electric current passes the armature coils 14 wound on the stator 10 and the q-axis current is 0. As illustrated in in FIG. 3, when the q-axis current is 0, most of the magnetic flux emanating from the certain permanent magnet 24 (N pole magnet), a magnetic flux A, flows toward the stator 10 and links with the armature coils 14 while some of the magnetic flux emanating from the certain permanent magnet (N pole magnet) 24, a leakage magnetic flux B, leaks to the permanent magnet (S pole magnet) 24 circumferentially adjacent on either side of the certain permanent magnet 24 mainly through the magnetic flux bypass paths 27. FIG. 3 illustrates how the leakage magnetic flux B leaks to the permanent magnet (S pole magnet) 24, with respect to one circumferential side only. That the leakage magnetic flux B flows through the magnetic flux bypass path 27 is understood from the fact that the magnetic flux density stands equally high at 2.0 T or more both in the magnetic flux inflow part 27a between the magnet slot 23 for fixing the certain permanent magnet (N pole magnet) 24 and the air gap 25 and in the magnetic flux outflow part 27b between the air gap 25 and the magnet slot 23 for fixing the permanent magnet (S pole magnet) 24 circumferentially adjacent on either side of the certain permanent magnet 24.

That the leakage magnetic flux B leaking from the certain permanent magnet (N pole magnet) 24 to the permanent magnet circumferentially adjacent on either side of the certain permanent magnet 24 flows through the magnetic flux bypass path 27, i.e., the portion between the magnet slot 23 for fixing the certain permanent magnet (N pole magnet) 24 and the air gap 25, the portion radially inward of the air gap 25, and the portion between the air gap 25 and the magnet slot 23 for fixing the permanent magnet (S pole magnet) 24 circumferentially adjacent on either side of the certain permanent magnet 24 means that the magnetic resistance through the magnetic flux bypass path 27 is somewhat smaller than the magnetic resistance through the portion radially outward of the air gap 25. That the magnetic resistance through the magnetic flux bypass path 27 is smaller than the magnetic resistance through the portion radially outward of the air gap 25 means that the width of the magnetic flux bypass path 27 is larger than the width of the portion radially outward of the air gap 25 in the rotor core 21. More specifically, the width between the magnet slot 23 for fixing the certain permanent magnet (N pole magnet) 24 and the air gap 25, the width of the portion radially inward of the air gap 25, and the width between the air gap 25 and the magnet slot 23 for fixing the permanent magnet (S pole magnet) 24 circumferentially adjacent on either side of the certain permanent magnet 24 are larger than the width of the portion radially outward of the air gap 25. The minimal width a (see FIG. 3) between the magnet slot 23 for fixing the certain permanent magnet (N pole magnet) 24 and the air gap 25 and the minimal width between the air gap 25 and the magnet slot 23 for fixing the permanent magnet (S pole magnet) 24 circumferentially adjacent on either side of the certain permanent magnet 24 are accordingly large. Therefore, sufficient mechanical strength is ensured for the width between the magnet slot 23 for fixing the certain permanent magnet (N pole magnet) 24 and the air gap 25 and for the width between the air gap 25 and the magnet slot 23 for fixing the permanent magnet (S pole magnet) 24 circumferentially adjacent on either side of the certain permanent magnet 24, and the rotor core 21 has no mechanically weak portion.

When electric current passes the armature coils 14 and a certain q-axis current flows, the leakage magnetic flux B leaking from the certain permanent magnet (N pole magnet) 24 to the permanent magnet (S pole magnet) 24 circumferentially adjacent on either side of the certain permanent magnet 24 deceases in proportion to the intensity of the q-axis current, increasing as a result the magnetic flux A flowing from the certain permanent magnet 24 (N pole magnet) toward the stator 10 and linking with the armature coils 14.

Figure 4:
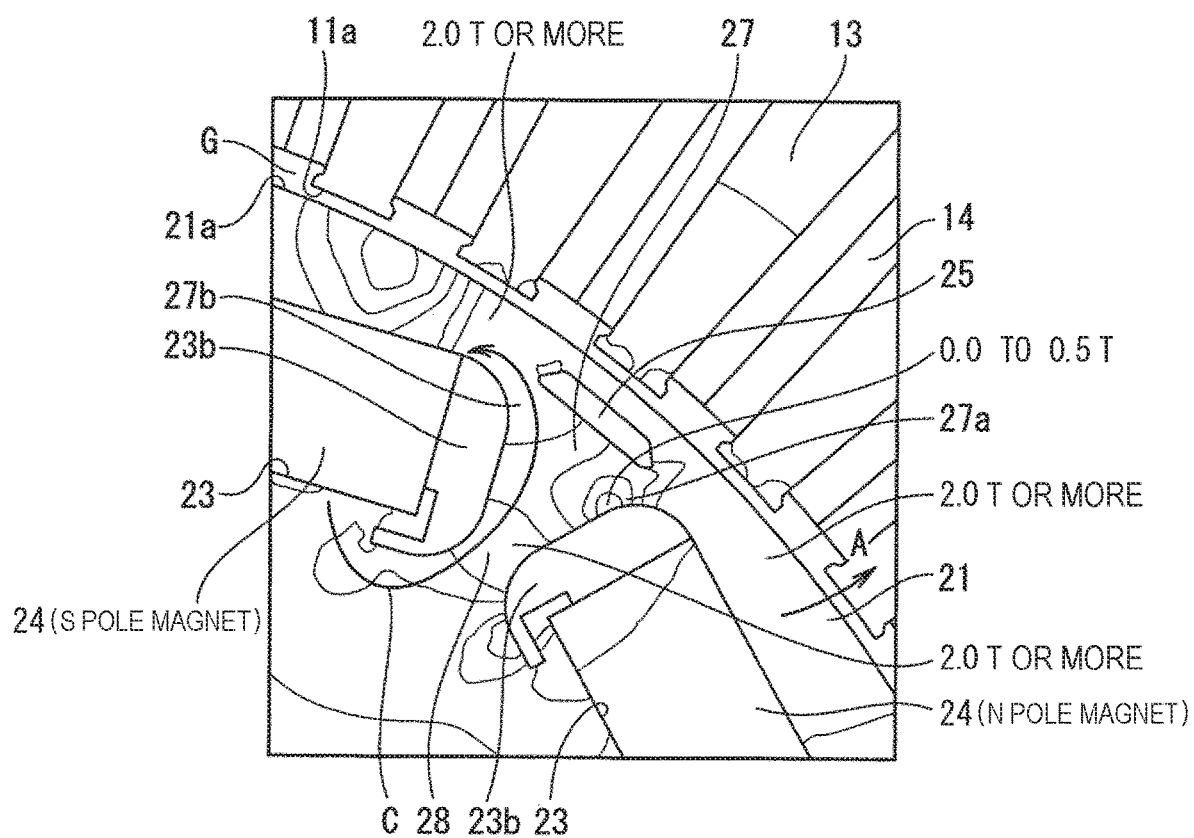
FIG. 4 is a contour map illustrative of a flow of magnetic flux when q-axis current has increased to maximize the magnetic flux linking with the armature coil.

Further, when the q-axis current further increases (for example, to approximately 70% or more of the maximal current), the leakage magnetic flux B leaking from the certain permanent magnet (N pole magnet) 24 to the permanent magnet (S pole magnet) 24 circumferentially adjacent on either side of the certain permanent magnet 24 further decreases and the flux B almost becomes close to 0 as illustrated in FIG. 4. This is understood from the fact that the magnetic flux density in the magnetic flux inflow part 27a of the magnetic flux bypass path 27 stands very low at 0.0 to 0.5 T as illustrated in FIG. 4. When the leakage magnetic flux B becomes close to 0, the magnetic flux A flowing from the certain permanent magnet (N pole magnet) 24 toward the stator 10 and linking with the armature coils 14 becomes maximal.

As described above, according to the variable magnetic flux-type permanent magnet rotary electric machine 1 according to the first embodiment, there is provided a variable magnetic flux-type permanent magnet rotary electric machine 1 wherein the leakage magnetic flux B leaking from a certain permanent magnet (N pole magnet) 24 included in the rotor core 21 to a permanent magnet (S pole magnet) 24 circumferentially adjacent on either side of the certain permanent magnet 24 is controlled by q-axis current and thereby the magnetic flux A linking with the armature coils 14 wound on the stator 10 is controlled without forming any mechanically weak portion in the rotor core 21.

With reference to FIG. 4, the magnetic flux density stands equally high at 2.0 T or more both in the magnet slot connection part 28, which connects the adjacent magnet slots 23, 23, and in the magnetic flux outflow part 27b of the magnetic flux bypass path 27 in the rotor core 21. This is because the leakage magnetic flux C emanating from the radially inner side of the permanent magnet (S pole magnet) 24 flows through the magnet slot connection part 28 and the magnetic flux outflow part 27b to the radially outer side of the permanent magnet 24 (S pole magnet). It is therefore preferable to render nonmagnetic the magnet slot connection part 28 connecting the magnet slots 23, 23 in the rotor core 21. By rendering the magnet slot connection part 28 nonmagnetic, it is possible to inhibit the leakage magnetic flux C flowing from the radially inner side of the permanent magnet (S pole magnet) 24 to the radially outer side of the permanent magnet (S pole magnet) 24 and to increase the magnetic flux A linking with the armature coils 14.

The magnet slot connection part 28 may be rendered nonmagnetic by processing techniques such as structure transformation by heat, carburization, pressing, and the like.

Second Embodiment

Figure 5:
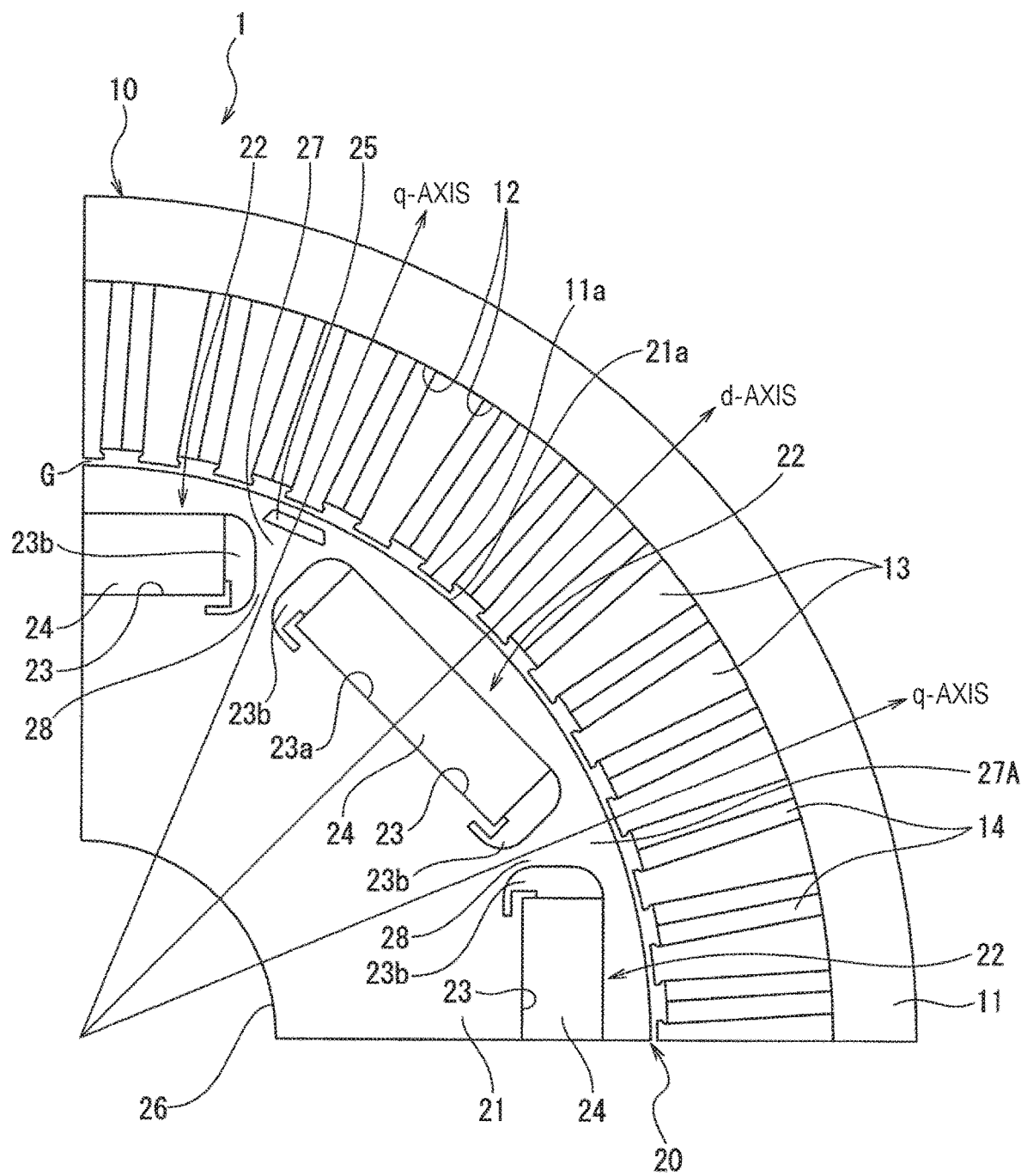
FIG. 5 is a cross-sectional view illustrative of a quarter portion of a variable magnetic flux-type permanent magnet rotary electric machine according to a second embodiment of the present invention.

Next, a variable magnetic flux-type permanent magnet rotary electric machine according to a second embodiment of the present invention will be described with reference to FIG. 5. In FIG. 5, the same members as illustrated in FIGS. 1 and 2 are denoted by the same reference numerals and may not be described in further detail.

The variable magnetic flux-type permanent magnet rotary electric machine 1 illustrated in FIG. 5 has the same basic structure as the permanent magnet rotary electric machine 1 according to the first embodiment illustrated in FIGS. 1 and 2 except that the air gaps 25 serving as nonmagnetic parts are disposed differently.

In particular, the permanent magnet rotary electric machine 1 according to the first embodiment illustrated in FIGS. 1 and 2 has air gaps 25 formed in all portions between adjacent magnetic poles 22 of the rotor core 21 while the permanent magnet rotary electric machine 1 illustrated in FIG. 5 has air gaps 25 formed in alternate portions between adjacent magnetic poles 22 of the rotor core 21.

By thus forming air gaps 25 in alternate portions between adjacent magnetic poles 22 of the rotor core 21, it is possible to increase the leakage amount of the leakage magnetic flux leaking from a certain permanent magnet (N pole magnet) 24 to a circumferentially adjacent permanent magnet (S pole magnet) 24 through a portion between adjacent magnetic poles 22 where no air gap 25 is formed.

The air gaps 25 of the permanent magnet rotary electric machine 1 illustrated in FIG. 5 are similar to the air gaps 25 of the permanent magnet rotary electric machine 1 according to the first embodiment illustrated in FIGS. 1 and 2 in that the air gaps 25 are formed radially outward of the magnet slots 24, are formed of a trapezoidal shape which is long and narrow in the circumferential direction, and are formed of through-holes reaching both axial ends of the rotor core 21.

Third Embodiment

Figure 6:
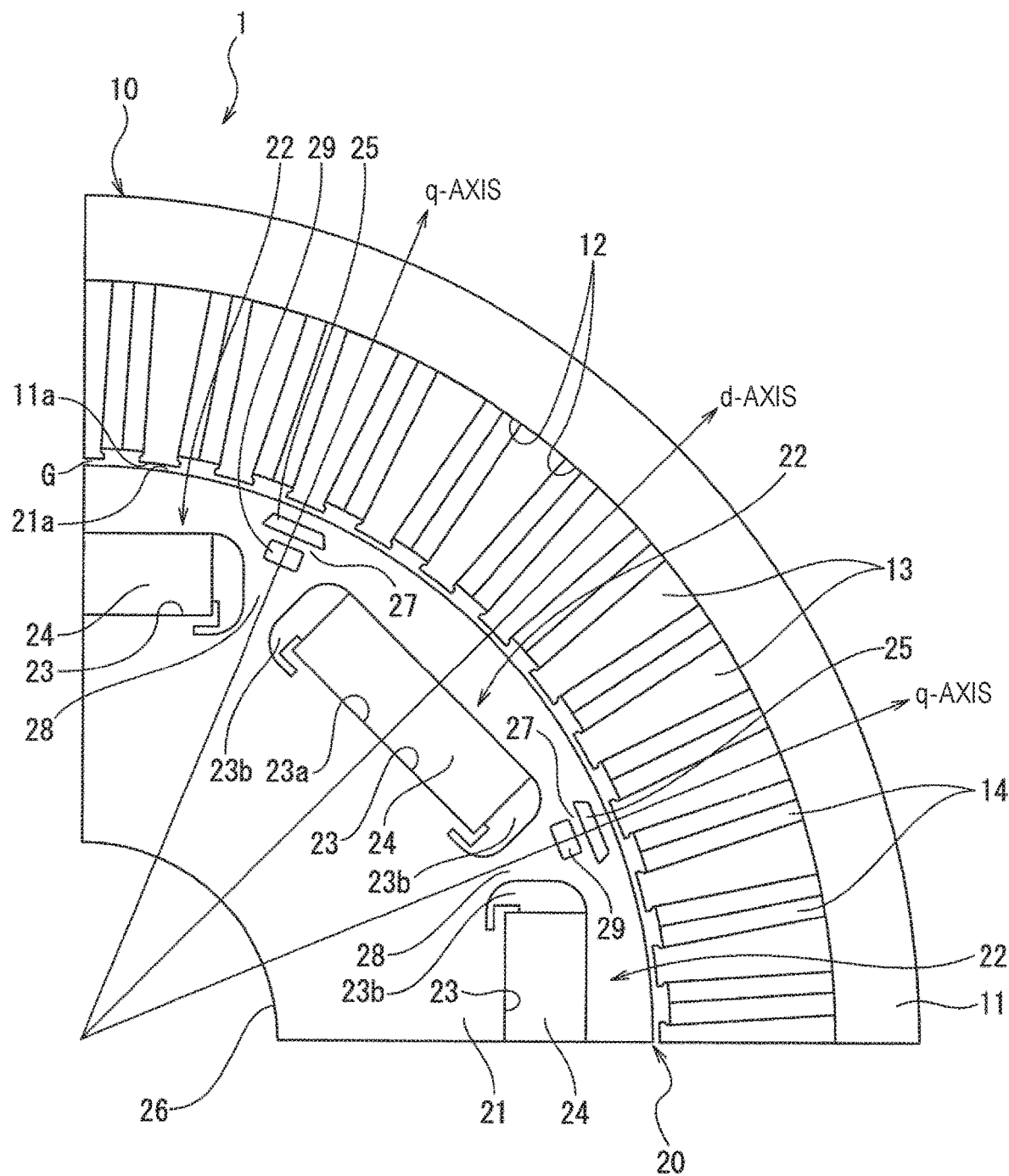
FIG. 6 is a cross-sectional view illustrative of a quarter portion of a variable magnetic flux-type permanent magnet rotary electric machine according to a third embodiment of the present invention.

Next, a variable magnetic flux-type permanent magnet rotary electric machine according to a third embodiment of the present invention will be described with reference to FIG. 6. In FIG. 6, the same members as illustrated in FIGS. 1 and 2 are denoted by the same reference numerals and may not be described in further detail.

The variable magnetic flux-type permanent magnet rotary electric machine 1 illustrated in FIG. 6 has the same basic structure as the permanent magnet rotary electric machine 1 according to the first embodiment illustrated in FIGS. 1 and 2 except that auxiliary magnets 29 are provided radially inward of all the air gaps 25 in the rotor core 21.

By thus providing the auxiliary magnets 29 radially inward of all the air gaps 25 in the rotor core 21, it is possible to increase the leakage magnetic flux leaking from a certain permanent magnet 24 (N pole magnet) to a permanent magnet (S pole magnet) 24 circumferentially adjacent on either side of the certain permanent magnet 24 through the magnetic flux bypass path 27.

The auxiliary magnets 29 are magnetized in the circumferential direction of the rotor core 21 and an auxiliary magnet 29 adjacent to the certain permanent magnet 24 (N pole magnet) has a south pole at the end facing the certain permanent magnet 24 and a north pole at the end facing the permanent magnet 24 (S pole magnet) circumferentially adjacent to the certain permanent magnet 24.

Fourth Embodiment

Figure 7:
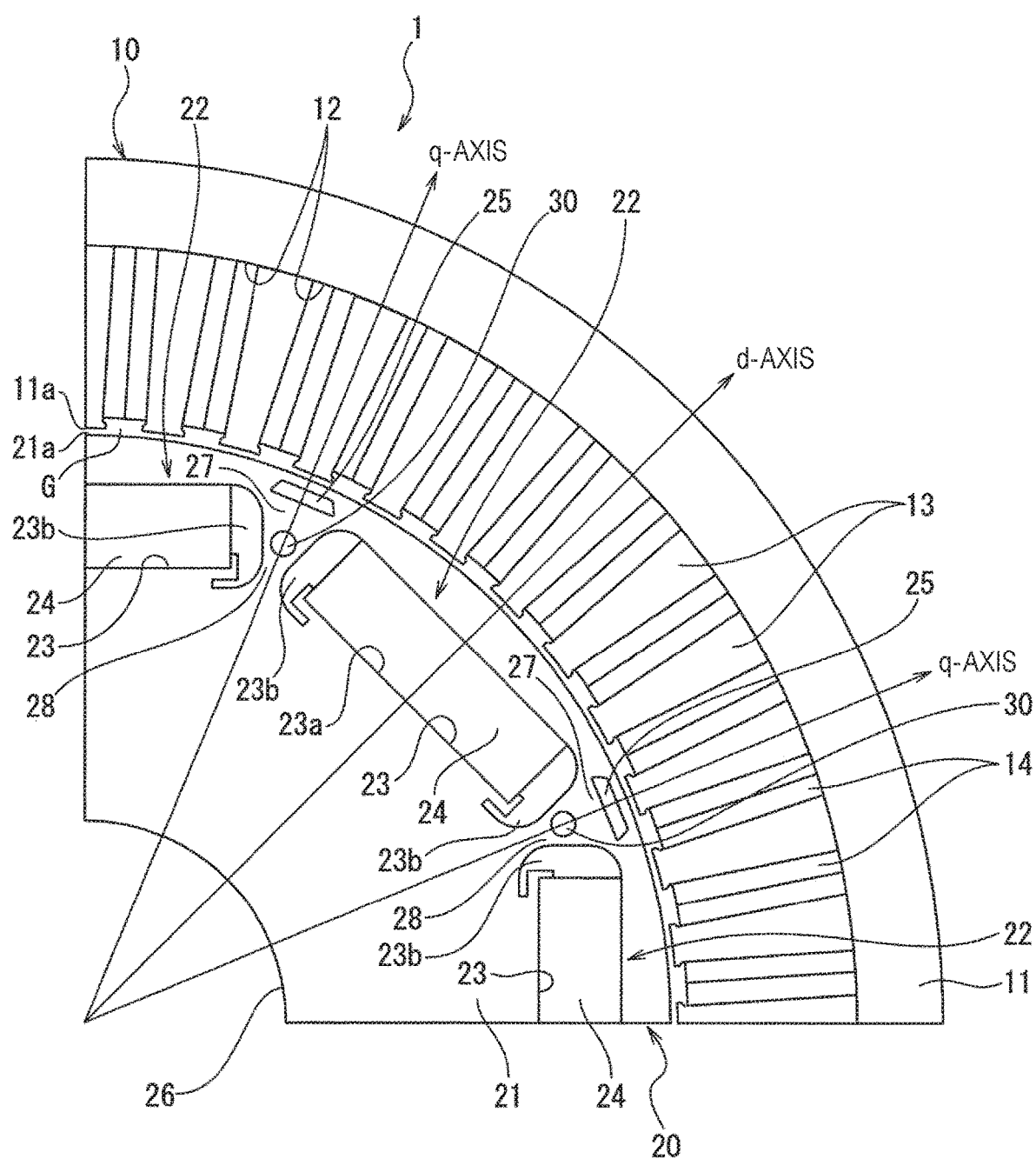
FIG. 7 is a cross-sectional view illustrative of a quarter portion of a variable magnetic flux-type permanent magnet rotary electric machine according to a fourth embodiment of the present invention.

Next, a variable magnetic flux-type permanent magnet rotary electric machine according to a fourth embodiment of the present invention will be described with reference to FIG. 7. In FIG. 7, the same members as illustrated in FIGS. 1 and 2 are denoted by the same reference numerals and may not be described in further detail.

The variable magnetic flux-type permanent magnet rotary electric machine 1 illustrated in FIG. 7 has the same basic structure as the permanent magnet rotary electric machine 1 according to the first embodiment illustrated in FIGS. 1 and 2 except that a hole 30 is formed in each of the magnet slot connection parts 28 connecting adjacent magnet slots 23, 23 in the rotor core 21.

By thus forming the holes 30 in the magnet slot connection parts 28, it is possible to inhibit the leakage magnetic flux C flowing from the radially inner side to the radially outer side of each permanent magnet (S pole magnet) 24 and to increase the magnetic flux A linking with the armature coils 14, as in the case in which the magnet slot connection parts 28 are rendered nonmagnetic.

The holes 30 are round through-holes reaching both axial ends of the rotor core 21.

Fifth Embodiment

Figure 8:
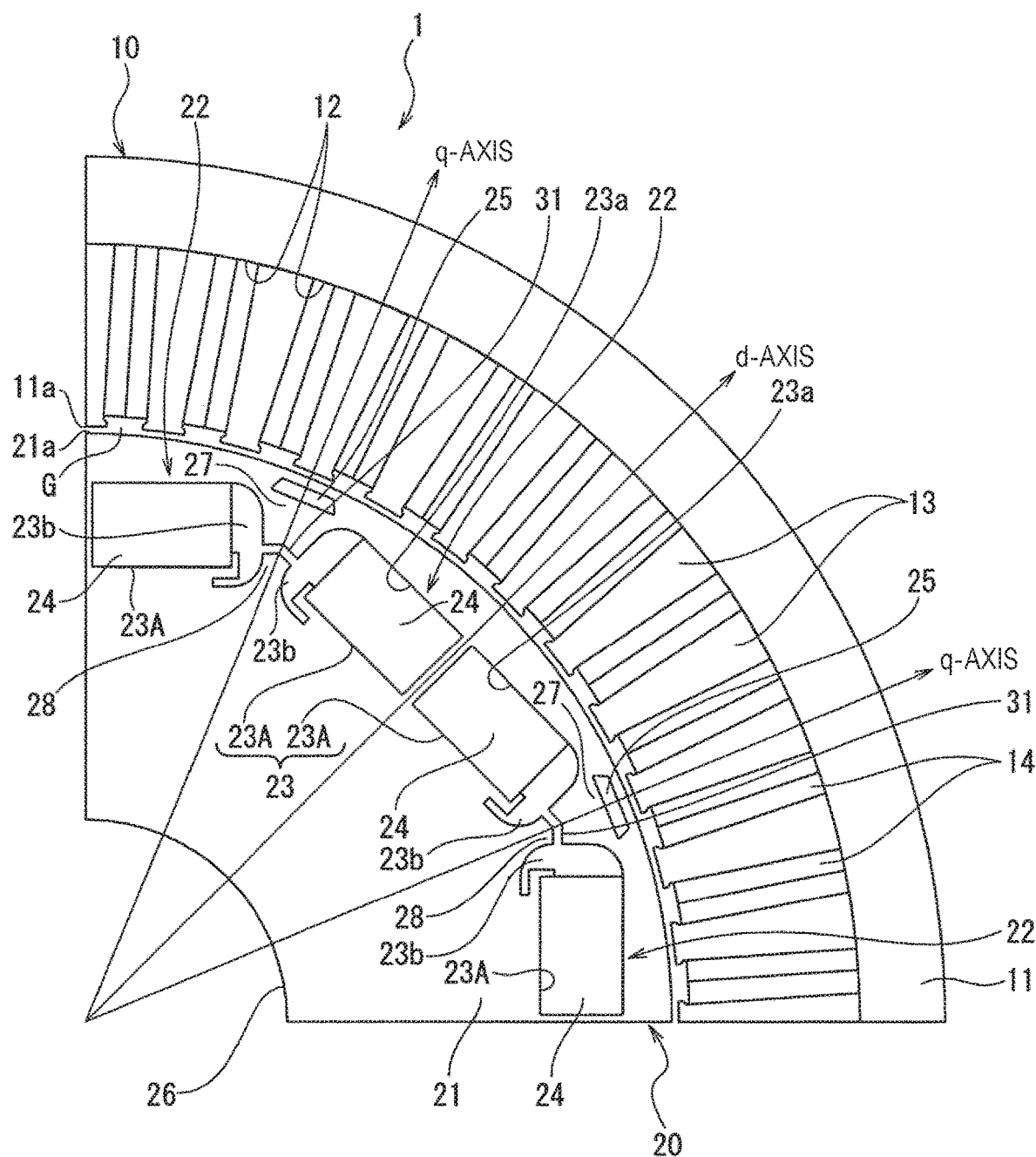
FIG. 8 is a cross-sectional view illustrative of a quarter portion of a variable magnetic flux-type permanent magnet rotary electric machine according to a fifth embodiment of the present invention.

Next, a variable magnetic flux-type permanent magnet rotary electric machine according to a fifth embodiment of the present invention will be described with reference to FIG. 8. In FIG. 8, the same members as illustrated in FIGS.

1 and 2 are denoted by the same reference numerals and may not be described in further detail.

The variable magnetic flux-type permanent magnet rotary electric machine 1 illustrated in FIG. 8 has the same basic structure as the permanent magnet rotary electric machine 1 according to the first embodiment illustrated in FIGS. 1 and 2 except that each of the eight magnet slots 23 is separated into two magnet slots 23A, 23A per one magnetic pole 22 and each of the eight permanent magnets 24 is accordingly separated into two. A further difference is that, in each of the magnet slot connection parts 28 connecting adjacent magnet slots 23A, 23A in the rotor core 21 is formed a communication hole 31 to enable communication between adjacent magnet slots 23A, 23A.

By thus forming a communication hole 31 to enable communication between adjacent magnet slots 23A, 23A in the rotor core 21 in each of the magnet slot connection parts 28 connecting adjacent magnet slots 23A, 23A, it is possible to inhibit the leakage magnetic flux C flowing from the radially inner side to the radially outer side of each permanent magnet (S pole magnet) 24 and to increase the magnetic flux A linking with the armature coils 14, as in the case in which the magnet slot connection parts 28 are made nonmagnetic.

The communication holes 31 are through-holes reaching both axial ends of the rotor core 21.

Further, since each of the eight magnet slots 23 is separated into two magnet slots 23A, 23A per one magnetic pole 22, the radially outward portion and the radially inward portion of the rotor core 21 across each magnet slot 23 are connected by the partitioning portion between the two magnet slots 23A, 23A and the mechanical strength of the rotor core 21 is not adversely affected.

Sixth Embodiment

Figure 9:
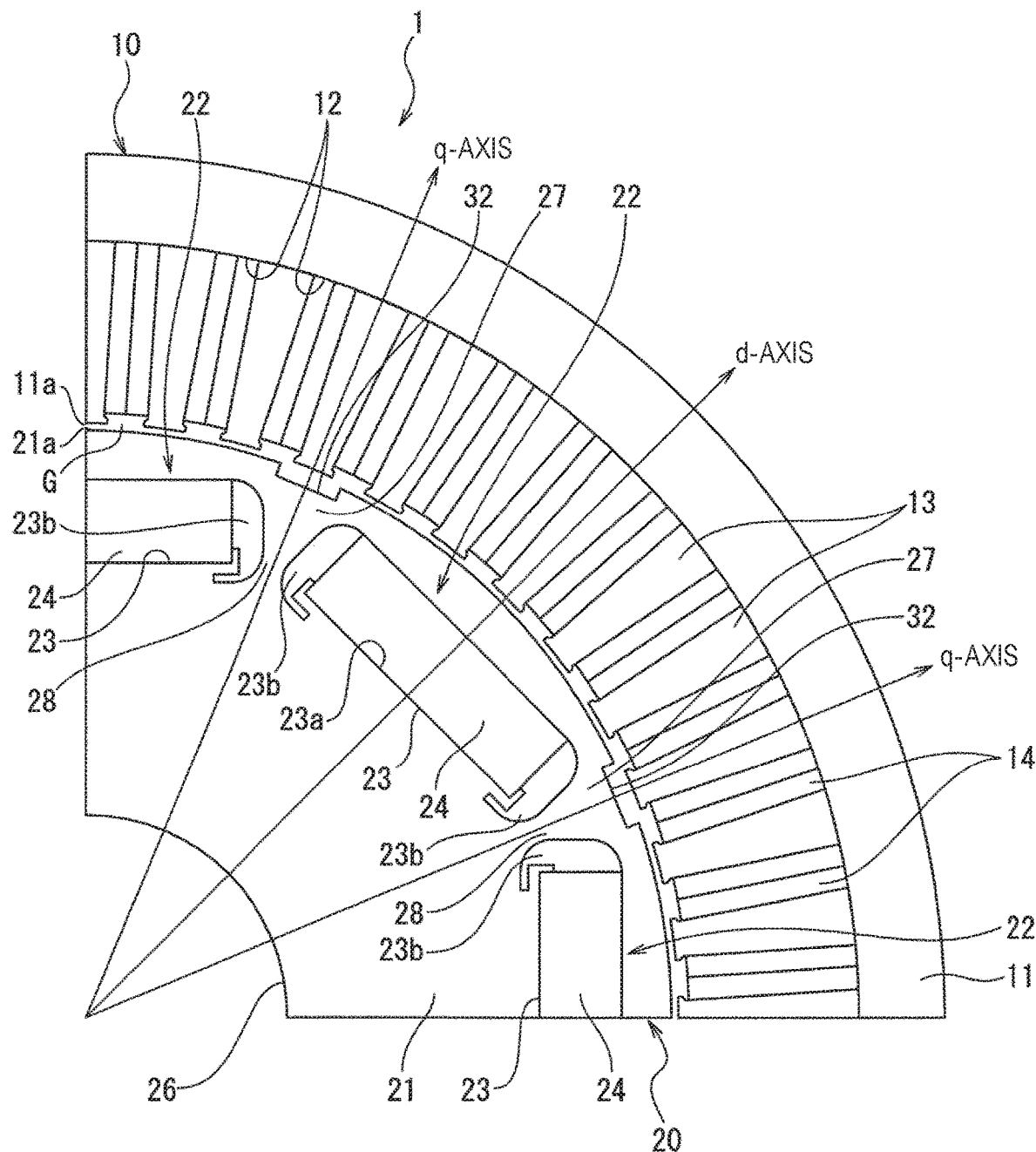
FIG. 9 is a cross-sectional view illustrative of a quarter portion of a variable magnetic flux-type permanent magnet rotary electric machine according to a sixth embodiment of the present invention.

Next, a variable magnetic flux-type permanent magnet rotary electric machine according to a sixth embodiment of the present invention will be described with reference to FIG. 9. In FIG. 9, the same members as illustrated in FIGS. 1 and 2 are denoted by the same reference numerals and may not be described in further detail.

The variable magnetic flux-type permanent magnet rotary electric machine 1 illustrated in FIG. 9 has the same basic structure as the permanent magnet rotary electric machine 1 according to the first embodiment illustrated in FIGS. 1 and 2 except that the structure of the nonmagnetic parts formed between adjacent magnetic poles 22 of the rotor core 21 and radially outward of the magnet slots 23 is different from that of the nonmagnetic part of the permanent magnet rotary electric machine 1 according to the first embodiment illustrated in FIGS. 1 and 2.

More specifically, the nonmagnetic parts of the permanent magnet rotary electric machine 1 illustrated in FIGS. 1 and 2 are constituted by the air gaps 25 formed at a certain distance radially inward from the outer circumferential surface 21a of the rotor core 21. In contrast, the nonmagnetic parts of the permanent magnet rotary electric machine 1 illustrated in FIG. 9 are constituted by grooves 32 formed concavely on the outer circumferential surface of the rotor core 21. The grooves 32 are through-grooves rectangular in cross section and reaching both axial ends of the rotor core 21.

The variable magnetic flux-type permanent magnet rotary electric machine 1 illustrated in FIG. 9 has a magnetic flux bypass path 27 for the leakage magnetic flux leaking from a certain permanent magnet (N pole magnet) 24 to a permanent magnet (S pole magnet) 24 circumferentially adjacent on either side of the certain permanent magnet 24, the magnetic flux bypass path 27 being formed in a portion between the magnet slot 23 for fixing the certain permanent magnet (N pole magnet) 24 and a groove 32, in a portion radially inward of the groove 32 and in a portion between the groove 32 and the magnet slot 23 for fixing the permanent magnet (S pole magnet) 24 circumferentially adjacent on either side of the certain permanent magnet 24.

The minimal width between the magnet slot 23 for fixing the certain permanent magnet (N pole magnet) 24 and the groove 32 and the minimal width between the groove 32 and the magnet slot 23 for fixing the permanent magnet (S pole magnet) 24 circumferentially adjacent on either side of the certain permanent magnet 24 are accordingly large, as in the first embodiment. Therefore, sufficient mechanical strength is ensured for the width between the magnet slot 23 for fixing the certain permanent magnet (N pole magnet) 24 and the groove 32 and for the width between the groove 32 and the magnet slot 23 for fixing the permanent magnet (S pole magnet) 24 circumferentially adjacent on either side of the certain permanent magnet 24, and the rotor core 21 has no mechanically weak portion.

Therefore, according to the variable magnetic flux-type permanent magnet rotary electric machine 1 according to the sixth embodiment illustrated in FIG. 9, similarly to the variable magnetic flux-type permanent magnet rotary electric machine 1 according to the first embodiment illustrated in FIGS. 1 to 2, there is provided a variable magnetic flux-type permanent magnet rotary electric machine 1 wherein the leakage magnetic flux leaking from the certain permanent magnet (N pole magnet) 24 included in the rotor core 21 to the permanent magnet (S pole magnet) 24 circumferentially adjacent on either side of the certain permanent magnet 24 is controlled by q-axis current and thereby the magnetic flux emanating from the certain permanent magnet 24 and linking with the armature coils 14 wound on the stator 10 is controlled without forming any mechanically weak portion in the rotor core 21.

Note that the nonmagnetic parts constituted by air gaps 25 in the second to fifth embodiments may also be constituted by grooves 32 instead.

Embodiments of the present invention have been described above but the above-described embodiments do not restrict the present invention, to which various modifications and improvements can be made.

For example, the variable magnetic flux-type permanent magnet rotary electric machine 1 according to the first to sixth embodiments has eight poles but the number of poles may be other than eight.

Further, the nonmagnetic parts are constituted by air gaps 25 in the permanent magnet rotary electric machine 1 according to the first to fifth embodiments and by grooves 32 in the permanent magnet rotary electric machine 1 according to the sixth embodiment but the nonmagnetic parts may be other than air gaps 25 and grooves 32 and may be constituted by rendering nonmagnetic the portions of the rotor core 21 in which the air gaps 25 or the grooves 32 are formed in the above-described embodiments. The portions may be rendered nonmagnetic by processing techniques such as structure transformation by heat, carburization, pressing, and the like.

Further, the air gaps 25 are formed in a shape elongated in the circumferential direction and trapezoidal in cross section in the permanent magnet rotary electric machine 1 according to the first to fifth embodiments but this does not restrict the shape of the air gaps 25, which may have a cross section of a different shape, for example, a cross section of a different slit-like shape elongated in the circumferential direction, of an inverted triangular shape, or of any other polygonal shape.

Further, the grooves 32 are formed in a rectangular shape in cross section in the permanent magnet rotary electric machine 1 according to the sixth embodiment but may be in any other shape in cross section.

Further, in the permanent magnet rotary electric machine 1 according to the third embodiment, the auxiliary magnets 29 are disposed radially inward of the air gaps 25, which are formed in all portions between adjacent magnetic poles 22 of the rotor core 21. In the permanent magnet rotary electric machine 1 according to the second embodiment, in which the air gaps 25 are formed in alternate portions between adjacent magnetic poles 22 of the rotor core 21, the auxiliary magnet 29 may be disposed radially inward of the air gaps 25 so formed only.

Further, in the permanent magnet rotary electric machine 1 according to the first to sixth embodiment, each of the magnet slots 23 is formed to be line symmetrical about the corresponding d-axis (symmetrical in the circumferential direction) but may be not line symmetrical about the corresponding d-axis.

REFERENCE SIGNS LIST 1 variable magnetic flux-type permanent magnet rotary electric machine
10 stator
11 stator core
14 armature coil
20 rotor
21 rotor core
22 magnetic pole
23 magnet slot
24 permanent magnet
25 air gap (nonmagnetic part)
27 magnetic flux bypass path
28 magnet slot connection part
29 auxiliary magnet
30 hole
31 communication hole
32 groove (nonmagnetic part)
G air gap

The invention claimed is:

1. A variable magnetic flux-type permanent magnet rotary electric machine comprising:
a stator including an armature coil wound on a stator core;
a rotor rotatably disposed inside the stator core of the stator with an air gap between the rotor and the stator core, the rotor including a cylindrical rotor core with a plurality of magnet slots disposed in a circumferential direction and a plurality of magnetic poles including a plurality of permanent magnets respectively fixed in the plurality of magnet slots, and
a nonmagnetic part formed between adjacent magnetic poles of the rotor core and radially outward of the magnet slots,
wherein a leakage magnetic flux leaking from a certain permanent magnet among the plurality of permanent magnets to a permanent magnet circumferentially adjacent on either side of the certain permanent magnet is controlled by q-axis current, a magnetic flux emanating from the certain permanent magnet and linking with the armature coil is controlled, and a magnetic flux bypass path for the leakage magnetic flux leaking from the certain permanent magnet to the permanent magnet circumferentially adjacent on either side of the certain permanent magnet is formed in a portion between the magnet slot for fixing the certain permanent magnet and the nonmagnetic part, in a portion radially inward of the nonmagnetic part, and in a portion between the nonmagnetic part and the magnet slot for fixing the permanent magnet circumferentially adjacent on either side of the certain permanent magnet.

2. The variable magnetic flux-type permanent magnet rotary electric machine according to claim 1, wherein a plurality of the nonmagnetic parts is formed in all portions between adjacent magnetic poles of the rotor core.

3. The variable magnetic flux-type permanent magnet rotary electric machine according to claim 1, wherein a plurality of the nonmagnetic parts is formed in alternate portions between adjacent magnetic poles of the rotor core.

4. The variable magnetic flux-type permanent magnet rotary electric machine according to claim 1, wherein an auxiliary magnet is disposed radially inward of the nonmagnetic part of the rotor core.

5. The variable magnetic flux-type permanent magnet rotary electric machine according to of claim 1, wherein a magnet slot connection part connecting adjacent the magnet slots of the rotor core is rendered nonmagnetic.

6. The variable magnetic flux-type permanent magnet rotary electric machine according to claim 1, wherein a hole is formed in a magnet slot connection part connecting adjacent the magnet slots of the rotor core.

7. The variable magnetic flux-type permanent magnet rotary electric machine according to claim 1, wherein each of the plurality of magnet slots and each of the plurality of permanent magnets are separated into two or more per one magnetic pole and wherein a communication hole is formed in a magnet slot connection part connecting adjacent the magnet slots to enable communication between the adjacent magnet slots.

8. The variable magnetic flux-type permanent magnet rotary electric machine according to claim 1, wherein the nonmagnetic part includes an air gap formed at a certain distance radially inward from an outer circumferential surface of the rotor core.

9. The variable magnetic flux-type permanent magnet rotary electric machine according to claim 1, wherein the nonmagnetic part includes a groove formed concavely on an outer circumferential surface of the rotor core.

10. The variable magnetic flux-type permanent magnet rotary electric machine according to claim 2, wherein a plurality of the nonmagnetic parts is formed in alternate portions between adjacent magnetic poles of the rotor core.

11. The variable magnetic flux-type permanent magnet rotary electric machine according to claim 2, wherein an auxiliary magnet is disposed radially inward of the nonmagnetic part of the rotor core.

12. The variable magnetic flux-type permanent magnet rotary electric machine according to claim 3, wherein an auxiliary magnet is disposed radially inward of the nonmagnetic part of the rotor core.

13. The variable magnetic flux-type permanent magnet rotary electric machine according to of claim 2, wherein a magnet slot connection part connecting adjacent the magnet slots of the rotor core is rendered nonmagnetic.

14. The variable magnetic flux-type permanent magnet rotary electric machine according to of claim 3, wherein a magnet slot connection part connecting adjacent the magnet slots of the rotor core is rendered nonmagnetic.

15. The variable magnetic flux-type permanent magnet rotary electric machine according to of claim 4, wherein a magnet slot connection part connecting adjacent the magnet slots of the rotor core is rendered nonmagnetic.

16. The variable magnetic flux-type permanent magnet rotary electric machine according to claim 2, wherein a hole is formed in a magnet slot connection part connecting adjacent the magnet slots of the rotor core.

17. The variable magnetic flux-type permanent magnet rotary electric machine according to claim 3, wherein a hole is formed in a magnet slot connection part connecting adjacent the magnet slots of the rotor core.

18. The variable magnetic flux-type permanent magnet rotary electric machine according to claim 4, wherein a hole is formed in a magnet slot connection part connecting adjacent the magnet slots of the rotor core.

19. The variable magnetic flux-type permanent magnet rotary electric machine according to claim 2, wherein each of the plurality of magnet slots and each of the plurality of permanent magnets are separated into two or more per one magnetic pole and wherein a communication hole is formed in a magnet slot connection part connecting adjacent the magnet slots to enable communication between the adjacent magnet slots.

20. The variable magnetic flux-type permanent magnet rotary electric machine according to claim 3, wherein each of the plurality of magnet slots and each of the plurality of permanent magnets are separated into two or more per one magnetic pole and wherein a communication hole is formed in a magnet slot connection part connecting adjacent the magnet slots to enable communication between the adjacent magnet slots.

* * * * *